(12) United States Patent
Keller et al.

(10) Patent No.: US 6,957,367 B2
(45) Date of Patent: Oct. 18, 2005

(54) SYSTEM AND METHOD FOR CONTROLLING ACTIVITY OF TEMPORARY FILES IN A COMPUTER SYSTEM

(75) Inventors: S. Brandon Keller, Evans, CO (US); Gregory Dennis Rogers, Fort Collins, CO (US); George Harold Robbert, Fort Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 568 days.

(21) Appl. No.: 10/231,529

(22) Filed: Aug. 30, 2002

(65) Prior Publication Data

US 2004/0044930 A1 Mar. 4, 2004

(51) Int. Cl.[7] ................................................ G06F 11/00
(52) U.S. Cl. ......................................... 714/48; 717/124
(58) Field of Search .............................. 714/48, 57, 37, 714/38, 39; 717/124, 108, 127, 131

(56) References Cited

U.S. PATENT DOCUMENTS

| | | | |
|---|---|---|---|
| 4,866,712 A | | 9/1989 | Chao |
| 5,598,333 A | * | 1/1997 | Marsico, Jr. .................. 714/38 |
| 5,968,113 A | * | 10/1999 | Haley et al. ................... 714/38 |
| 6,154,876 A | * | 11/2000 | Haley et al. ................. 717/133 |
| 6,732,155 B2 | * | 5/2004 | Meek .......................... 709/206 |

FOREIGN PATENT DOCUMENTS

| | | | |
|---|---|---|---|
| EP | 0458556 A3 | 11/1991 | |
| EP | 000458556 A2 | * 11/1991 | ........... G06F/11/00 |
| JP | 63318647 | 12/1988 | |

* cited by examiner

Primary Examiner—Nadeem Iqbal

(57) ABSTRACT

A method for controlling activity of a temporary file associated with a target file to which data is to be written.

21 Claims, 5 Drawing Sheets

SYSTEM AND METHOD FOR CONTROLLING ACTIVITY OF TEMPORARY FILES IN A COMPUTER SYSTEM

TECHNICAL FIELD

The present invention relates generally to computer systems, and more particularly, to a method for controlling the movement and deletion of files during a software tool's runtime in a computer system.

BACKGROUND

File I/O within a software tool is typically handled by a software developer (programmer). For example, if a programmer wants to open a file for writing, utilizing a temporary file to preserve the original data until the new file is complete, that process is typically coded by the programmer. In a distributed network running two or more copies of the same software tool, file updates can cause data concurrency problems, and other errors affecting the original data can occur because of incorrect handling of certain situations where the original state of the data in a file need to be preserved.

SUMMARY

The present method provides a system that automates the file control process and enables a programmer to open files with specific file closing modes that are guaranteed to follow the behavior intended by the programmer. Each time a system file is opened within a software tool, it is opened through a file system controller object (or more simply 'file controller object'). This object is passed the name of the file to be opened (the 'target' file) and the mode with which to close the file in the event of an I/O error. The present method provides a mode whereby a temporary file is opened to which all data will be written.

When the file is closed through the file controller object interface in a normal manner, the temporary file associated with the original file is moved to the corresponding target file. In the event of a serious error, such as a 'fatal' I/O error, the controller object is destroyed, and the associated destructor closes the open files and processes them according to the file closing mode (shown above) that was registered with the file controller object when the file was first opened.

The present method advantageously handles serious error situations, as opposed to handling minor errors, which can usually be dealt with by user program error handling code. This method also saves the programmer from needing to know exactly which files were open and being modified at the time the error occurred; the controller object handles file cleanup in this situation.

The present method removes the burden from the programmer of needing to ensure that all files are properly closed if an error occurs within a program that causes premature termination of the program. The use of a file system controller development of modules needing the functionality contained within the file controller module.

DETAILED DESCRIPTION

In one embodiment, the present method operates in an object-oriented software programming environment to control the activity of temporary files used by programs, such as software tools, during the course of their runtime. In accordance with the present method, a software developer or other system user using an object-oriented programming language, such as C++, creates a 'file controller' object within a software tool or other program, to handle the opening, closing, and conditional deletion of temporary files used by the program, in accordance with specified modes, as described below. These temporary files are used for intermediate storage of data intended to be written from a user program to a 'target' file.

Figure 1:
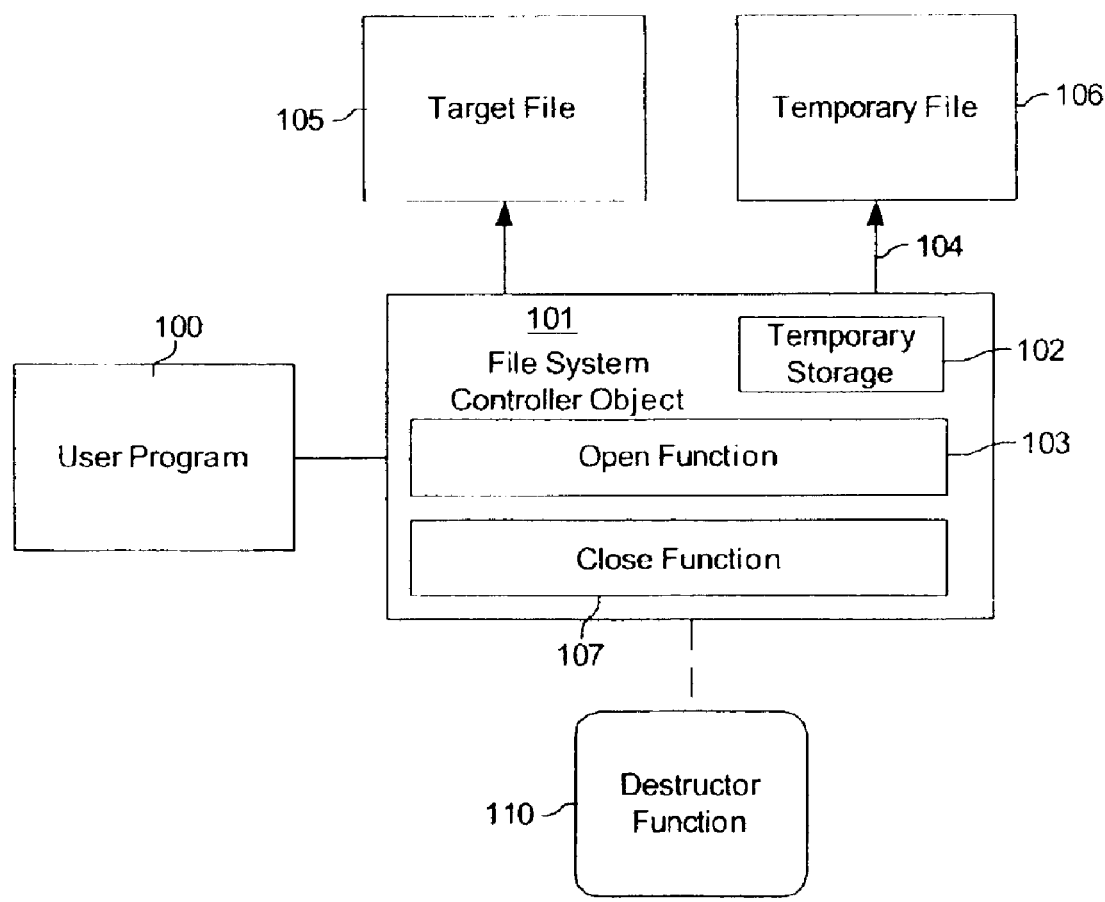
FIG. 1 is a diagram illustrating exemplary software components in an object-oriented system with which the present method is used.
Figure 2:
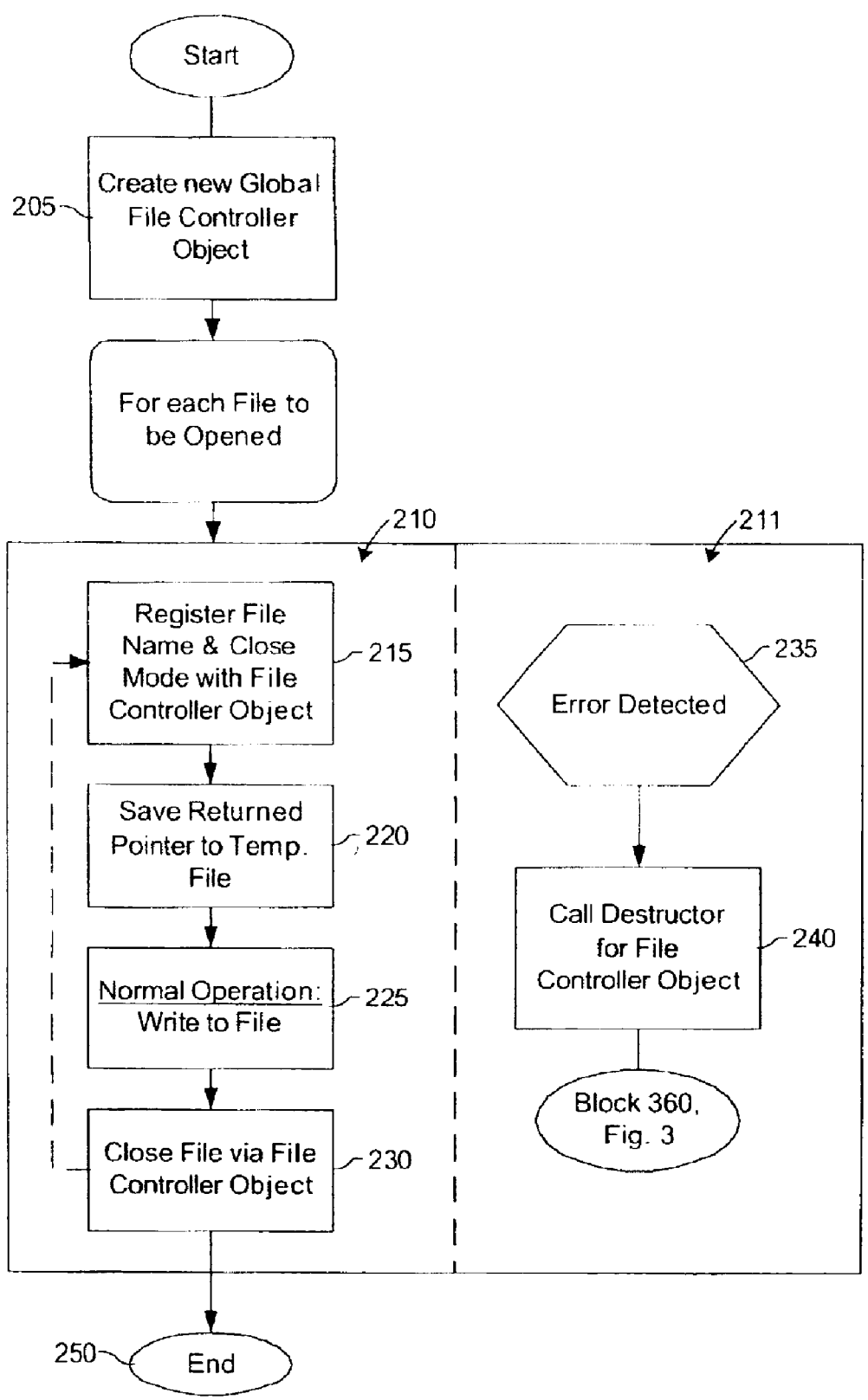
FIG. 2 is a flowchart illustrating, from a program view, exemplary steps which may be performed in practicing one embodiment of the method of the present method.

FIG. 1 is a diagram illustrating exemplary software components in an object-oriented system with which the present method is advantageously used, and FIG. 2 is a flowchart illustrating, from a user program view, a sequence of exemplary steps performed in practicing one embodiment of the present method. Operation of the present method is best understood by viewing FIGS. 1 and 2 in developer or other user (hereinafter called the 'user') creates a global file system controller object ('file controller object') 101 within a software tool or other user program 100.

In the present embodiment, for each file to be opened, as shown in block 210, steps 215 and 220 are performed. In an alternative embodiment, for example, in a Perl software environment, a separate file controller object 101 may be created for each file to be opened, and thus step 205 would be included within block 210. At step 215, the file name and mode with which a temporary file is to be closed on an error condition is registered with the file controller object 101. Although other file opening modes may be employed by a user program and file controller object, the present method is concerned only with a file opening mode that opens a temporary file for all user program write operations. At step 220, the user program 100 receives, from the controller object 101, a pointer 104 to, or other indicia of, a temporary file that has been created by the controller object. The user program 100 uses this file pointer to direct all write operations to temporary file 106, rather than the original target file 105, during the duration of the program 100.

If a 'fatal' error (or other error deemed to be sufficiently serious) is detected in the normal course of the user program execution, at step 235 the error handling code shown in block 211 may be executed, depending on the nature of the error. This error handling code calls a 'destructor' function that is associated with the file controller object 101. As part of the code for the file controller object 101 (described below), a program developer or other user creates a function 110 termed a 'destructor', which in an exemplary embodiment, is a method on the file controller object class. In the C++ programming language, for example, object classes each have a method called a 'destructor' which is called when the object is destroyed. Objects can be destroyed by going out of scope, or by being explicitly deleted by the programmer. As indicated above, an error that occurs during the normal course of the user program execution may cause user program 100 to request execution of the file controller object class destructor 110. The destructor 110 also always executes automatically (i.e., is invoked by the associated operating system) whenever an object goes out of scope, as in the case of an abnormal termination of the user program. temporary files 106 previously opened. The user program 100 does not actually change the stored values in the target file 105 because the user program file writes all data to the temporary file 106 created by controller object 101 using the pointer 104 returned from the file controller object. The file controller object 101 also handles the renaming of the temporary file 106 for file open and close operations.

At step 230, the user program 100 calls the file controller object 101 to close the temporary file 106. At step 250, termination of user program 100 causes the file controller object 101, which is within the scope of the user program, to go out of scope. The destructor 110 for the 'file controller object' class is then automatically invoked. However, it should be noted that the special handling of temporary files only occurs in the file controller object destructor 110 in the event of an error situation. If the user program 101 runs normally, the temporary file 106 is closed via the file controller object 101, which then knows that the file is no longer open, and thus does not need to perform any further action when the file controller object destructor is executed for that particular file.

Figure 3:
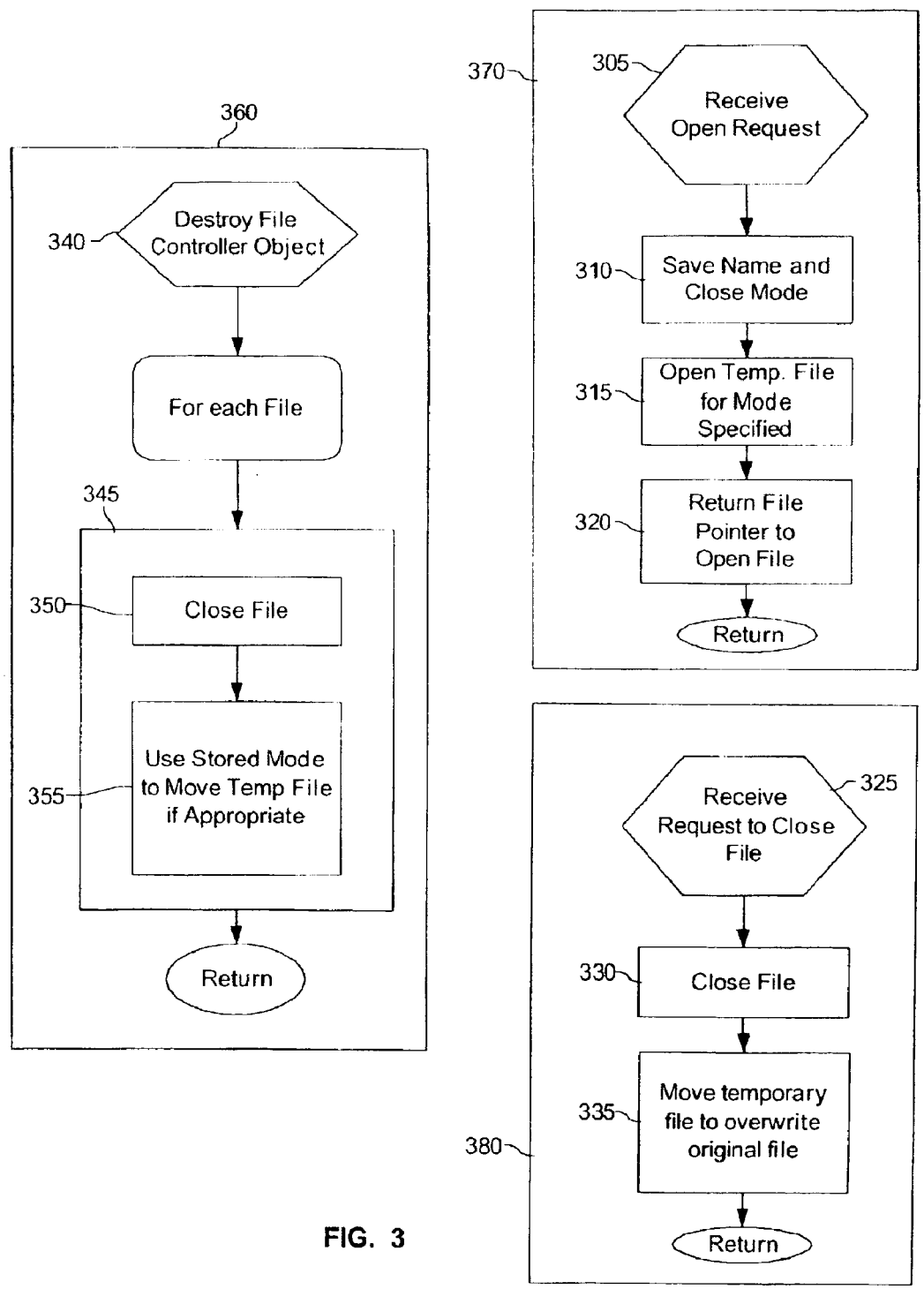
FIG. 3 is a flowchart illustrating, from a file system controller view, exemplary steps which may be performed in practicing one embodiment of the method of the present method.

FIG. 3 is a flowchart illustrating, from the file system controller view, exemplary steps which may be performed in practicing one embodiment of the present method. As shown in FIG. 3, at step 305, a request to open a file (see step 215 in FIG. 2) is received from user program 100. At step 310, the name of the target file to be written to and the modes for opening and closing the file are saved in temporary storage 102. It is assumed, for the present method, that the mode selected for opening the file indicates that a temporary file, to which all data will be written from user program 100, is to be opened. It is possible to open files using other modes; however, the present method is concerned only with a mode that uses (and opens) a temporary file for all user program I/O. Therefore, only this particular file opening mode is considered in the present document. Accordingly, at step 315, a temporary file 106 is opened by the file controller object 101. A pointer 104 to the opened file is then returned to the user program 100 at step 320.

At step 325, the file controller object 101 receives a request from the user program 100 to close the temporary file 106. At step 330, temporary file 106 is closed. At step 335, the temporary file is moved to replace the original file, since complete.

If a 'fatal' error (or other error deemed to be sufficiently serious) occurs during the normal course of user program execution, the destructor 110 for the controller object 101 is called, and the code for block 360 is executed. Other types of errors, such as program errors (due to, for example, bad input data), or even a system error (e.g., a floating point error) may cause destructor 110 to be executed. Depending on the type of error, the destructor 110 is called either by the user program error handler 211 or by the associated operating system. Errors can be detected in many ways; for example, by an interrupt, by checking a returned argument after an attempted open or write operation, or by a signal mechanism. Regardless of the specific type of error, it is assumed that any unrecoverable error incurred during normal program execution is one that is a 'fatal' error. Thus, a fatal error handler function, e.g., a destructor function 110, is coded to explicitly delete the file controller object, and handle the optional closing and/or moving of temporary file 106 in accordance with the mode with which it was initially registered. The file controller object 101 is normally destroyed if no errors are detected, and in normal operation, temporary file 106 is closed before the controller object 101 is destroyed.

Table 1, below, is an exemplary list showing three types of modes with which temporary files can be closed.

TABLE 1

| | |
|---|---|
| close_mode_1 | Unconditionally move contents of temporary file to original file, thereby deleting the temporary file. |
| close_mode_2 | Leave the temporary file in place, and leave the original file intact. |
| close_mode_3 | Delete the temporary file, and leave the original file intact. |

If the file closing mode is mode 1 ('close_mode_1'), then the contents of the original ('target') file 105 are effectively replaced by the contents of temporary file 106. This process may be accomplished either by either copying the contents of temporary file 106 to target file 105, or more expeditiously, by moving the temporary file to the original file, which in effect is a renaming (or pointer-manipulation) process, rather than a physical copying operation. The temporary file 106 is thus, in effect, deleted. Use of this mode assumes that all necessary updates to the data in temporary file 106 will have been made at the time the file is closed, since the contents of original file are effectively replaced with the contents of the temporary file, regardless of whether updates to the temporary file were actually completed.

If the file closing mode is mode 2 ('close_mode_2'), then the contents of both the temporary file 106 and the original ('target') file 105 are left intact. This mode allows the developer or programmer to decide how to treat the temporary file, since the updates thereto may be only partially complete.

If the file closing mode is mode 3 ('close_mode_3'), then the temporary file 106 is deleted, and the original ('target') file 105 is left intact. This mode assumes that the updates to the temporary file 106 are only partially complete, and saves the original data in the target file, thus ensuring that valuable data that should be overwritten only with a complete copy of data is protected from accidental corruption when running the user program.

In an exemplary embodiment employing the C++ programming language, a destructor mechanism is a 'built-in' function of the language. In other object-oriented programming languages, a functionally analogous 'destructor'-type mechanism may be implemented to restore changed data values on successful exit from a function. All that is needed to implement the destructor function is a mechanism to force a code block to be executed on exit from a function. For example, after any 'try' block in the Java programming language, a 'finally' block can be specified. The 'finally' block will execute, no matter how the 'try' block exits—either normally or exceptionally. In general, a 'close' method, called at the end of a user function, may be employed to provide a functional equivalent for the C++ destructor. The destructor function may exist, for example, in a shared library.

More specifically, when the destructor 110 is called, steps 340 through 355 are executed for each temporary file 106 created by file controller object 101. At step 340, the controller object 101 is destroyed. At step 350, temporary file which it was initially registered, as described with respect to step 335 in FIG. 2.

Table 2 lists a segment of exemplary pseudocode for a user program 100 and file controller object 101. Section '[A]' in Table 2 lists the user program 100, shown as a main function which initially creates a new file controller object, to be destroyed at the end the main function by automatically going out of scope. Since an object-oriented language generally requires declaration of an object's structure, the file controller object's interface and data structure are shown in section'[B]'. User program 100 next calls the file controller object 'open' method (function) 103. In the present example, arguments are passed to the file controller object 101 indicating the file name of the target file ('User_File_1') 105, and the mode with which the associated temporary file 106 is to be closed ('close_mode_1') in the event of an error.

Section '[C]' in Table 2 is the method (function) 103 of the file controller class that handles the opening of files. In response to a request from user program 100 to open a target file 105, this 'open' function 103 opens a temporary file 106 of name 'temporary_file_name' for writing, but hides the fact from the user program 100 that a temporary file 106 is opened. The name for the temporary file may be generated by any algorithm that can determine a suitably unique (e.g., local system-wide) file name. The file name generating algorithm is known to the developer and/or available via the system programming environment, so that a temporary file 106 (that is closed in mode 2) may be located after data has been written thereto by a user program that has terminated. Open function 103 then passes a pointer 104 ('pointer_to_open_file') to the temporary file back to the user program 100.

User program 100 (section '[A]') then writes data to the temporary file 106, using the pointer 104. All write operations from the user program 100 will thus be directed to the temporary file 106, rather than to the target file 105. After all data has been written to the temporary file 106, the user program closes the file by calling the file controller object 'close' method (function) 107. The controller object close function 107, listed in section '[D]', then closes the temporary file 106, and moves the temporary file onto the original filename, thus effectively deleting the Next, user program 100 calls the file controller object open function 103 to open another file ('user_file_2') using 'close mode 2'. The user program then writes data to temporary file 106 using the file pointer returned by the controller object. For the purpose of the present example, assume that an error occurs at this point, causing the function main( ) to abnormally terminate. Since the present temporary file 106 has not been explicitly closed (via a call to the controller object 'close' method (function) 107), the file controller object destructor 110 is called.

At this point, destructor 110, listed in section '[E]' of Table 2, handles each temporary file 106 (for clarity, only a single temporary file 106 is shown in FIG. 1) according to the previously saved mode for that file, which in the present example, is the protocol for 'close mode 2'. Since this mode leaves both the temporary file 106 and the original target file 105 in place, no further processing by the destructor 110 is necessary. As indicated above, the algorithm for determining the name of the undeleted temporary file 106 is known to the developer/system so that the temporary file can be subsequently accessed directly by a user program.

TABLE 2

```
[A]
// User Program
int main() {
    FileController file_controller_object;
    // Open a file with close_mode_1
    FILE *file_pointer = file_controller_object.OpenFile("user_file_1",
"close_mode_1");
    // Write data to the now open file (actually the temporary copy)
    PrintDataToFile(file_pointer, "Some example data\n");
    // Close the file, since all data has been written. Since the
    // FileController object knows that the file was opened with
    // close_mode_1, the temporary file will be moved onto the
    // original file name ("user_file_1").
    // Open another file with close_mode_2
    FILE *other_file_pointer =
file_controller_object.OpenFile("user_file_2", "close_mode_2");
    // Write some data to the file
    PrintDataToFile(other_file_pointer, "Some example data\n");
    // If an error occurs at this point, since no CloseFile call has
    // been made on 'other_file_pointer, the FileController object
    // destructor will handle the temporary file according to the
    // protocol for 'close_mode_2'.
}
[B]
// Declaration section for the file controller object
class FileController {
    OpenFile(file_name, file_close_mode);
    CloseFile(pointer_to_open_file);
    Destructor();
    // The file name, and the mode to be used to close the associated
    // temporary file, is stored in temporary storage 102 for each file
    // pointer inside the FileController object.
    struct FileInfo {
        file_close_mode;
        file_name;
```

TABLE 2-continued

```
        }
            map<pointer_to_open_file, FileInfo> file_info_map;
    };
// -*The methods of the FileController class are defined below*-
[C]
FileController::OpenFile(
        file_name,
        file_close_mode)
{
        // Use the system open call to open the file for writing,
        // and use an algorithm to create a temporary file of the new name.
        temporary_file_name = file_name + UserProgramProcessId +
UserMachineName;
        FILE *pointer_to_open_file = SystemOpenFile(temporary_file_name,
"overwrite");
        file_info_map[pointer_to_open_file] = (file_close_mode, file_name);
}
[D]
// This function closes a file that was previously opened, and moves
// the temporary file onto the original filename.
FileController::CloseFile(
        pointer_to_open_file)
{
        // Create the temporary file name, so that the contents can be
        // moved onto the original file name.
        temporary_file_name = file_name + UserProgramProcessId +
UserMachineName;
        // Now, get the file name from the information stored in the
        // FileController object.
        (file_close_mode, file_name) = file_info_map[pointer_to_open_file];
        // Now, use the system to move the contents of the temporary file
        // onto the original file name.
        SystemMoveFile(temporary_file_name, file_name);
        // Finally, remove the file from the list of open files handled by
        // the FileController object.
        delete file_info_map[pointer_to_file];
}
// This function handles each temporary file according to its
// stored close mode.
FileController::Destructor()
{
        foreach pointer_to_open_file (keys_file_info_map) {
            // Get the file information for the file that is still open.
            (file_close_mode, file_name) = file_info_map[pointer_to_open_file];
            // Since the temporary file may need to be moved or deleted,
            // the name of the file needs to be calculated.
            temporary_file_name = file_name + UserProgramProcessId +
UserMachineName;
            // Now, check the close mode that was specified, and handle the
            // temporary file appropriately.
            if (file_close_mode == "close_mode_1") {
                SystemMoveFile(temporary_file_name, file_name);
            }
            else if (file_close_mode == "close_mode_2") {
            // Since this mode leaves both files in place, no further
            // processing by the destructor is necessary.
            }
            else if (file_close_mode == "close_mode_3") {
                SystemDeleteFile(temporary_file_name);
            }
            // Now, remove the file from the file_info_map.
            delete file_info_map[pointer_to_file];
        }
        // After looping through all of the open files, each file
        // has been handled according to its 'close mode'; thus all
        // file I/O has been concluded.
}
```

Figure 4:
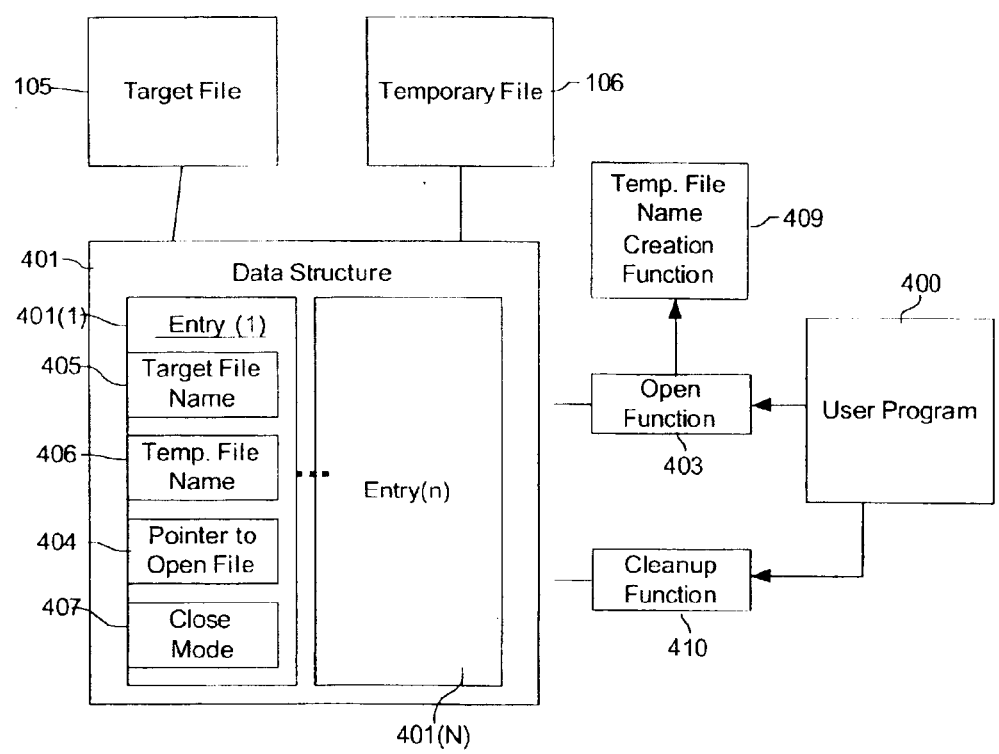
FIG. 4 is a diagram illustrating exemplary software components in an alternative embodiment of the present method.
Figure 5:
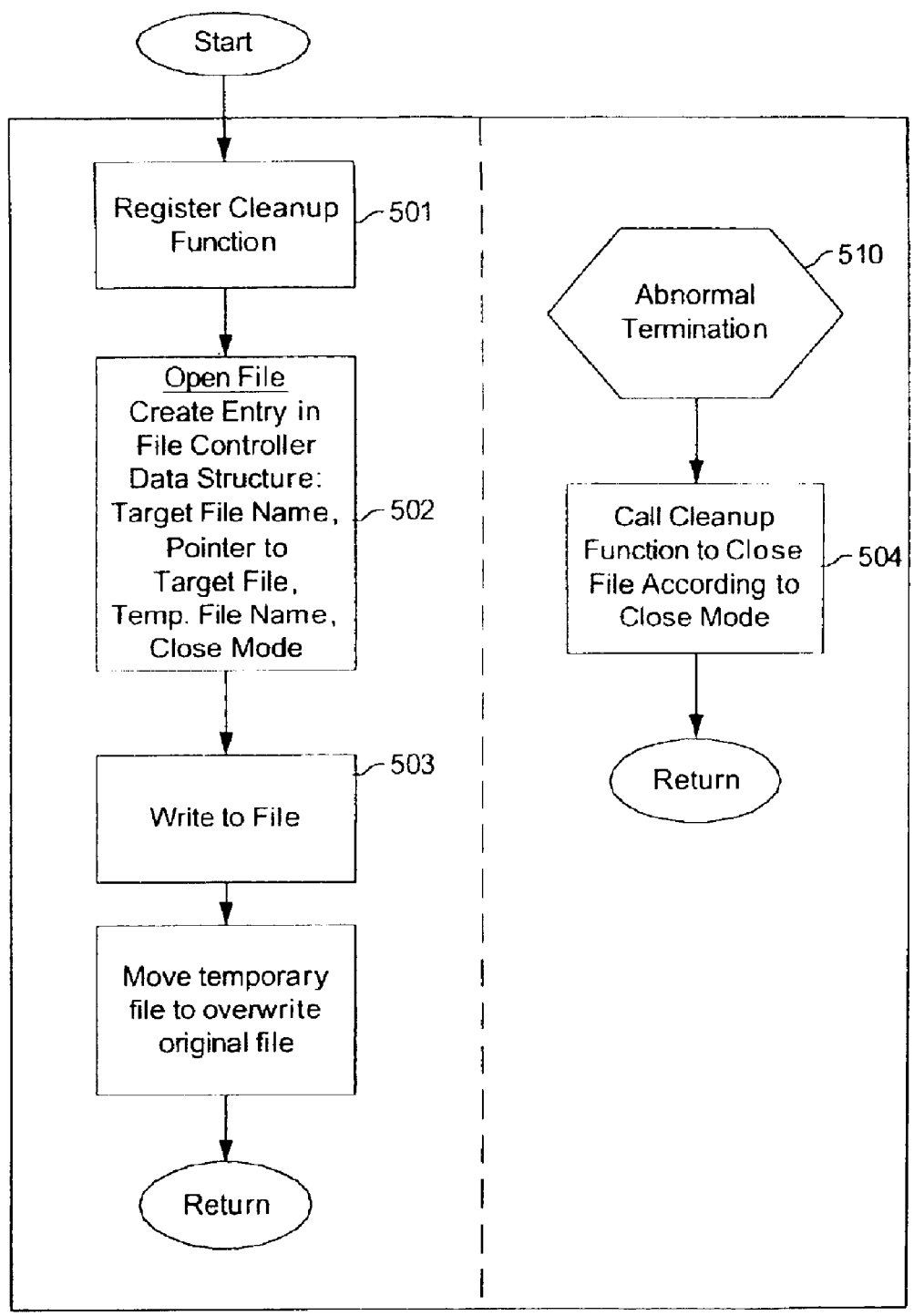
FIG. 5 is a flowchart illustrating exemplary steps which may be performed in practicing the embodiment shown in FIG. 4.

An alternative exemplary embodiment of the present method is shown in FIGS. 4 and 5. FIG. 4 is a diagram illustrating exemplary software components employed in an alternative embodiment of the present method and FIG. 5 is a flowchart illustrating exemplary steps which may be performed in practicing the embodiment shown in FIG. 4. Operation of the present method is best understood by viewing FIGS. 4 and 5 in conjunction with one another. As shown in FIGS. 4 and 5, at step 501, user program 400 registers a file closing 'cleanup' function 410 with a method or function that operates like the Java 'finalize' routine (described above), in that it forces a code block to be executed on exit from the user program 400. The C programming language, for example, has a method, similar to Java's 'finalize' routine, called 'atexit( )'. When a program registers a function with atexit(FunctionName), that function will be called regardless of how the program exits. Thus, in this way, the file controller object concept defined in the previously described embodiment may be expanded, using a final function call, to include non-object oriented systems.

At step 502, user program 400 calls an 'open' function 403 to create an association, in a global data structure 401, between a target file 105, a temporary file 106, and a method for closing the file (a 'close mode'). Each time a function is called for opening a file, an entry 401(n) is added to the global data structure. This functionality is handled inside the file controller object class described above, but in programming languages that lack the concept of classes, e.g., in non-object-oriented program environments, separate functions as described herein are employed to perform equivalent functionality. Thus, the present embodiment exhibits the functionality of a file controller 'object' 101, although it comprises a collection of functions.

More specifically, at step 502, open function 403 creates a temporary file 106, and then creates an entry 401(n) in global data structure 401 that includes the target file name 405, a pointer 404 to an open file handle, and the mode ('close mode') 407 with which temporary file 106 is to be closed. Open function 403 creates a name for temporary file 106 by calling a function 409 that creates a suitably name may be included in the open function 403 itself. In any event, the function 409 or algorithm for determining the name of temporary file 106 is known to the developer/system so that the temporary file can be subsequently accessed directly by a user program. Open function 403 also stores this temporary file name 406 in entry 401(n) in the data structure 401. Thus, any function within the program that needs the temporary file name 406 can simply look it up in the data structure.

At step 503, user program 100 writes data, ultimately intended for target file 105, to temporary file 106, using the pointer 404 in the appropriate entry 401(n) in data structure 401. At step 504, user program exits, causing cleanup function 410 to be called. In the present embodiment, cleanup function 410 looks at each entry in the global data structure, and handles each open temporary file according to its 'close mode', in a manner identical to the process described above with respect to step 335 of FIG. 2. In the event of abnormal termination of user program 100 at step 510, cleanup function 410 is also called.

What is claimed is:

1. A method for controlling activity of a temporary file associated with a target file to which data is to be written in an object-oriented programming environment comprising the steps of:
    creating a file controller object within a user program;
    registering, with the file controller object, a file closing mode;
    creating a temporary file for writing data thereto from the user program;
    passing indicia of the temporary file, from the controller object to the user program;
    writing said data to the temporary file, using said indicia; and
    closing the temporary file, in the event of an error condition, in accordance with the file closing mode registered with the file controller object.

2. The method of claim 1, including the step of closing the file in accordance with the file closing mode registered with the file controller object, when said error condition is detected.

3. The method of claim 2, wherein the temporary file is closed via a destructor function associated with the file controller object, in accordance with the file closing mode registered with the file controller object.

4. The method of claim 3, wherein the destructor function is called by the user program on determination of said error condition.

5. The method of claim 3, wherein the destructor function is invoked automatically on termination of the user program.

6. The method of claim 1, wherein the step of registering includes registering the name of the target file and the file closing mode.

7. The method of claim 6, wherein the step of closing the file includes moving the data in the temporary file to the target file.

8. The method of claim 6, wherein the step of closing the file includes moving the data in the temporary file to the target file, and deleting the temporary file.

9. The method of claim 6, wherein the step of closing the file includes leaving intact the temporary file and the target file.

10. The method of claim 6, wherein the step of closing the file includes deleting the temporary file and leaving intact the target file.

11. The method of claim 1, wherein said file closing mode alternatively comprises a first mode, a second mode, or a third mode, wherein:
    said first mode indicates that the temporary file is to be unconditionally moved to the target file;
    said second mode indicates that the temporary file is to be left in place, and the target file is to be left intact; and
    said third mode indicates that the temporary file is to be deleted, and the target file is to be left intact.

12. A system for controlling activity of a temporary file associated with a target file to which data is to be written in a software programming environment comprising:
    a file opening function for creating a temporary file for writing data thereto from a user program, and
    a global data structure, accessible to the file closing function and the user program; and
    a file closing function for closing the temporary file, in the event of an error condition, in accordance with a file closing mode located in the data structure;
    wherein the file opening function creates an entry in the data structure comprising data indicative of a name of said temporary file, a name of a target file associated with said temporary file, and the file closing mode with which temporary file is to be closed.

13. The system of claim 12, wherein said file opening function also creates a pointer to an open file handle in said entry in the data structure.

14. The system of claim 12, wherein said file closing mode indicates one of the following actions is to be performed:
    the temporary file is to be unconditionally moved to the target file;
    the temporary file is to be left in place, and the target file is to be left intact; or
    the temporary file is to be deleted, and the target file is to be left intact.

15. The system of claim 14, wherein the file closing function is called by the user program on determination of said error condition.

16. The system of claim 14, wherein the file closing function is invoked automatically on determination of said error condition by the associated operating system.

17. A method for controlling activity of a temporary file associated with a target file to which data is to be written in a software programming environment comprising the steps of:

creating a file opening function;

creating a file closing function for handling the temporary file in accordance with a file closing mode;

creating a global data structure, accessible to the file closing function and the user program;

registering, with the file opening function, a file closing mode;

creating a temporary file for writing data thereto from the user program;

creating an entry in the data structure comprising data indicative of a name of said temporary file, the name of the target file, and the file closing mode with which temporary file is to be closed;

writing data to the temporary file, using the data in the entry in the data structure; and handling the temporary file in accordance with the file closing mode in the data structure, in the event of an error condition.

18. The method of claim 17, wherein said file closing mode indicates one of the following actions is to be performed:

the temporary file is to be unconditionally moved to the target file; or the temporary file is to be left in place, and the target file is to be left intact; or the temporary file is to be deleted, and the target file is to be left intact.

19. The system of claim 18, wherein the file closing function is called by the user program on determination of said error condition.

20. The system of claim 18, wherein the file closing function is invoked automatically on determination of said error condition by the associated operating system.

21. A system for controlling activity of a temporary file associated with a target file to which data is to be written in an object-oriented programming environment comprising:

means for creating a file controller object within a user program;

means for registering, with the file controller object, a file closing mode;

means for creating a temporary file for writing data thereto from the user program;

means for passing indicia of the temporary file, from the controller object to the user program;

means for writing said data to the temporary file, using said indicia; and means for closing the temporary file, in the event of an error condition, in accordance with the file closing mode registered with the file controller object.

* * * * *

UNITED STATES PATENT AND TRADEMARK OFFICE
CERTIFICATE OF CORRECTION

PATENT NO. : 6,957,367 B2  
APPLICATION NO. : 10/231529  
DATED : October 18, 2005  
INVENTOR(S) : S. Brandon Keller et al.

It is certified that error appears in the above-identified patent and that said Letters Patent is hereby corrected as shown below:

On the Title page, in field (73), in "Assignee", in column 1, line 2, after "Company" insert -- , --.

In column 1, line 58, after "controller" insert -- object simplifies the programmer's view of file control, enabling faster software --.

In column 2, line 33, after "FIGS. 1 and 2 in" insert -- conjunction with one another. As shown in Figures 1 and 2, at step 205, a software --.

In column 3, line 9, before "program." insert -- During normal operation, at step 225, data is written to one or more --.

In column 3, line 53, after "since" insert -- the user program initiated the file close action and all writes to the temporary file are --.

In column 5, line 3, after "file" insert -- 106 is closed, and the temporary file is handled in accordance with the mode with --.

In column 5, in "Table 2", line 13, after "("user_file_1")." insert -- file controller_object.CloseFile(file_pointer); --.

In column 6, line 11, after "deleting the" insert -- temporary file. --.

In column 8, in "Table 2", line 37, after "}" insert -- [E] --.

UNITED STATES PATENT AND TRADEMARK OFFICE
CERTIFICATE OF CORRECTION

PATENT NO. : 6,957,367 B2
APPLICATION NO. : 10/231529
DATED : October 18, 2005
INVENTOR(S) : S. Brandon Keller et al.

It is certified that error appears in the above-identified patent and that said Letters Patent is hereby corrected as shown below:

In column 9, line 23, after "suitably" insert -- unique file name 406. Alternatively, the algorithm for creating the temporary file --.

Signed and Sealed this

Twenty-fourth Day of November, 2009

David J. Kappos
*Director of the United States Patent and Trademark Office*